United States Patent
Boucadair et al.

(10) Patent No.: US 12,489,784 B2
(45) Date of Patent: Dec. 2, 2025

(54) METHODS FOR VERIFYING THE VALIDITY OF AN IP RESOURCE, AND ASSOCIATED ACCESS CONTROL SERVER, VALIDATION SERVER, CLIENT NODE, RELAY NODE AND COMPUTER PROGRAM

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 172 days.

(21) Appl. No.: 17/256,386

(22) PCT Filed: Jun. 28, 2019

(86) PCT No.: PCT/FR2019/051609
§ 371 (c)(1),
(2) Date: Dec. 28, 2020

(87) PCT Pub. No.: WO2020/002856
PCT Pub. Date: Jan. 2, 2020

(65) Prior Publication Data
US 2021/0273974 A1    Sep. 2, 2021

(30) Foreign Application Priority Data
Jun. 29, 2018    (FR) ...................................... 1856015

(51) Int. Cl.
*H04L 9/40* (2022.01)
(52) U.S. Cl.
CPC ...... *H04L 63/1458* (2013.01); *H04L 63/0236* (2013.01); *H04L 63/0263* (2013.01); *H04L 63/101* (2013.01)

(58) Field of Classification Search
CPC ............ H04L 63/1458; H04L 63/0236; H04L 63/0263; H04L 63/101; H04L 2101/695;
(Continued)

(56) References Cited

U.S. PATENT DOCUMENTS 8,392,421 B1 *   3/2013   Nucci .................... G06F 16/951
                                                        707/739
8,769,622 B2     7/2014   Chang et al.
(Continued)

FOREIGN PATENT DOCUMENTS

| CN | 1937499 A    |   | 3/2007 |          |
|----|--------------|---|--------|----------|
| CN | 100539501 C  | * | 9/2009 | H04L 9/32|
| CN | 103563294 A  |   | 2/2014 |          |

OTHER PUBLICATIONS

English translation of the Written Opinion of the International Searching Authority dated Sep. 16, 2019 for corresponding International Application No. PCT/FR2019/051609 filed Jun. 28, 2019.
(Continued)

*Primary Examiner* — Farid Homayounmehr
*Assistant Examiner* — Suman Debnath
(74) *Attorney, Agent, or Firm* — David D. Brush; Westman, Champlin & Koehler, P.A.

(57) ABSTRACT

A method for verifying validity of an IP resource associated with a client domain, implemented in an access control server. The method includes: receiving a list of at least one IP resource associated with the client domain, transmitted from a client node of the client domain to the access control server; selecting at least one IP resource to be validated from the list; and verifying the validity of the at least one selected IP resource.

18 Claims, 8 Drawing Sheets

(58) Field of Classification Search
CPC .. H04L 63/0245; H04L 63/1466; H04L 61/35
See application file for complete search history.

(56) References Cited

U.S. PATENT DOCUMENTS

| | | | |
|---|---|---|---|
| 9,288,214 | B2 | 3/2016 | Chang et al. |
| 10,542,001 | B1* | 1/2020 | Leung ................ H04L 63/1441 |
| 2013/0007845 | A1 | 1/2013 | Chang et al. |
| 2014/0373138 | A1* | 12/2014 | Park ................ H04L 63/1458 726/22 |
| 2015/0007274 | A1 | 1/2015 | Chang et al. |
| 2016/0028554 | A1* | 1/2016 | Lea ................ H04W 12/06 370/312 |
| 2016/0173526 | A1* | 6/2016 | Kasman ............. H04L 63/1458 726/23 |
| 2017/0149833 | A1* | 5/2017 | Ngo ................ H04W 24/02 |
| 2018/0041468 | A1* | 2/2018 | Miller ................ H04L 61/5007 |
| 2018/0054438 | A1* | 2/2018 | Li ................ H04L 63/0876 |
| 2018/0109554 | A1 | 4/2018 | Reddy et al. |
| 2018/0159894 | A1* | 6/2018 | Reddy ................ H04L 63/1458 |
| 2019/0327222 | A1* | 10/2019 | Hsu ................ H04L 63/166 |

OTHER PUBLICATIONS

"Internet X.509 Public Key Infrastructure Certificate and Certificate Revocation List (CRL) Profile", D. Cooper et al., RFC 5280, May 2008.
"Distributed Denial-of-Service Open Threat Signaling (DOTS) Signal 25 Channel Specification", draft-ietf-dots-signal-channel, Reddy, T. et al., Jan. 2018.
First Chinese Office Action dated Sep. 20, 2022, for corresponding Chinese Application No. 201980051584.6.
International Search Report and Written Opinion dated Sep. 6, 2019 for corresponding International Application No. PCT/FR2019/051609, filed Jun. 28, 2019.
Mortensen et al., "Distributed Denial of Service (DDoC) Open Threat Signaling Requirements; draft0ietf-dots-requirements-14.txt", Distributed Denial of Service (DDOS) Open Threat Signaling Requriements; Draft-IETF-DOTS-REQUIREMENTS-14.txt; Internet-Draft; Dots, Internet Engineering Task Force, IETF; Standard Working Draft, Internet Society (ISOC) 4, Rue Des Falaises CH-1205 Gene, No. 14, Feb. 8, 2018 (Feb. 8, 2018), pp. 1-20. XP015125616.
Mortenson et al., "Distributed Denial of Service Open Threat Signaling (DOTS) Architecture; draft-ietf-dots-architecture=05.txt", Distributed Denial of Service Open Threat Signaling (DOTS) Architecture; Draft-IETF-DOTS-ARCHITECTURE; Internet-Draft; Dots, Internet Engineering Task Force, IETF; Standard WorkingDraft, Internet Society (ISOC) 4, Rue Des Falaises CH-1205 Gene, No. 5, Oct. 26, 2017 (Oct. 26, 2017), pp. 1-30, XP015122508.
D. Eastlake et al., "Randomness Requirements for Security", RFC 4086, Jan. 2005.
T. Reddy et al., "Distributed Denial-of-Service Open Threat Signaling (DOTS) Data Channel-11", draft-ietfdots-data-channel, Dec. 18, 2017.
P. Ferguson et al., "Network Ingress Filtering: Defeating Denial of Service Attacks which employ IP Source Address Spoofing", RFC2827, May 2000.
E. Guttman et al., "Users' Security Handbook" RFC2504, Feb. 1999.
E. Rescorla et al., "Datagram Transport Layer Security Version 1.2", RFC 6347, DOI 10.17487/RFC6347, Jan. 2012.
E. Rescorla et al., "The Datagram Transport Layer Security (DTLS) Protocol Version 1.3", draft-ietf-tls-dtls13-22, Nov. 29, 2017.
T. Dierks et al., "The Transport Layer Security (TLS) Protocol Version 1.2", RFC 5246, DOI 10.17487/RFC5246, Aug. 2008.
E. Rescorla, "The Transport Layer Security (TLS) Protocol Version 1.3", draft-ietf-tlstls13-23, Jan. 5, 2018.
D. McGrew, "An Interface and Algorithms for Authenticated Encryption", RFC5116, Jan. 2008.
P. Leach et al., "A Universally Unique IDentifier (UUID) URN Namespace", RFC4122, Jul. 2005.

* cited by examiner

METHODS FOR VERIFYING THE VALIDITY OF AN IP RESOURCE, AND ASSOCIATED ACCESS CONTROL SERVER, VALIDATION SERVER, CLIENT NODE, RELAY NODE AND COMPUTER PROGRAM

CROSS-REFERENCE TO RELATED APPLICATIONS

This Application is a Section 371 National Stage Application of International Application No. PCT/FR2019/051609, filed Jun. 28, 2019, which is incorporated by reference in its entirety and published as WO 2020/002856 A1 on Jan. 2, 2020, not in English.

1. FIELD OF THE INVENTION

The field of the invention is that of communications within a communication network, for example an IP network, and in particular that of added-value IP services.

More specifically, the invention provides a solution for verifying the validity of an IP resource associated with a domain, i.e. verifying that an IP address, an IP prefix (set of IP addresses), a domain name, etc., is effectively associated with that domain.

The invention notably has applications, but not exclusively, in the field of mitigation of DDoS (Distributed Denial of Service) attacks, in particular to facilitate the coordination of the mitigation actions. It can notably be implemented before or during a mitigation procedure.

2. PRIOR ART

An existing problem in the field of mitigation of distributed denial of service attacks is more specifically described in the remainder of this document The invention is of course not limited to this particular field of applications, but, more generally, the invention is of interest for any technique in which the validity of an IP resource needs to be verified before taking any action relating to said resource.

As a reminder, a DDoS attack is an attempt to make resources, for example network or computing resources, unavailable to their users. Such attacks can be massively deployed by compromising a large number of hosts, and using these hosts to amplify the attacks.

In order to mitigate these DDoS attacks, DDoS attack detection and mitigation services are offered by some access or service providers to their customers. Such mitigation services (DDoS Protection Services) can be hosted within the infrastructures operated by the access providers or in the cloud. In particular, they make it possible to distinguish between "legitimate" traffic, i.e. data consented to by the user, and "suspicious" traffic.

When a DPS-type service is hosted in the cloud, it is difficult to identify a DDoS attack in advance, because such a service is not present on the routing paths (by default) used to reach the network that is the victim of a DDoS attack.

To solve this problem, it has notably been proposed to set up tunnels to force the invocation of the DPS service for all (incoming or outgoing) traffic in a network. However, this approach significantly increases the latency observed by the users and imposes constraints on the sizing of the DPS service to be able to handle all the traffic of all the users of the network.

When a DPS-type service is hosted within an infrastructure operated by an access provider, even if the DPS service is present on the routing path of incoming traffic of a network, difficulties may arise in identifying suspicious traffic. In particular, with the increase in encrypted traffic, especially carried on UDP (for example, QUIC traffic "Quick UDP Internet Connection"), it is difficult to distinguish legitimate traffic from suspicious traffic. The difficulty of accessing the plain text control messages, such as the messages (SYN/SYN-ACK/ACK) provided for in the TCP protocol, can indeed make the determination of a network node's consent to receive traffic complex.

In order to help identify suspicious traffic, a specific architecture has been standardised by the IETF. Such an architecture, called DOTS (DDoS Open Threat Signaling), allows a client node, called a DOTS client, to inform a server, called a DOTS server, that its network is subject to a DDoS attack and that appropriate actions are required.

Thus, if a client domain is the target of a DDoS attack, a DOTS client attached to that client domain can send a message to the DOTS server asking for help. The latter coordinates with a mitigator to ensure that suspicious traffic associated with the denial of service attack is no longer routed to the client domain, while legitimate traffic continues to be routed normally to the client domain.

This solution uses two communication channels between the DOTS client and the DOTS server:
  a DOTS Signal Channel, and
  a DOTS Data Channel.

The DOTS signal channel is only used when a DDoS attack is in progress. Thus, a DOTS client can use this channel to request help from the DOTS server. For example, a DOTS client uses this signal channel to send a request to the server informing it that the prefix "1.2.3.0/24" is under a DDoS attack, so that the server can take action to stop the attack. Such a signal channel is notably described in the document "*Distributed Denial-of-Service Open Threat Signaling (DOTS) Signal Channel Specification*", draft-ietf-dots-signal-channel, Reddy, T. et al., January 2018.

The DOTS data channel is used when no DDoS attack is in progress. For example, a DOTS client can use this channel to install filter rules, such as filtering of the traffic received from certain addresses or that destined for a given node. For example, a DOTS client can use this DOTS data channel to instruct the server to block all traffic to the prefix "1.2.3.0/24". Such a data channel is described in "*Distributed Denial-of-Service Open Threat Signaling (DOTS) Data Channel*", draft-ietf-dots-data-channel, Reddy, T. et al. December 2017.

It should be noted that if the server does not have a mechanism to verify that the prefix "1.2.3.0/24" is actually associated with the DOTS client domain, service disruptions may be observed by the legitimate owner of this prefix (i.e. the entity in charge of managing this prefix, for example, the access provider). In particular, the nodes to which an address extracted from this prefix is allocated may no longer receive traffic in the case where measures are implemented to bypass traffic associated with this prefix or to filter all traffic with a destination address involving this prefix.

Moreover, the DDoS mitigation service may be charged to the legitimate owners although they did not issue the mitigation request.

Furthermore, to solve the problem of IP address spoofing, the IETF recommends the activation of BCP 38 ("*Network Ingress Filtering: Defeating Denial of Service Attacks which employ IP Source Address Spoofing*", P. Ferguson et al., May 2000), and of the uRPF function (Unicast Reverse Path Forwarding, RFC2504: "*Users' Security Handbook*" E.

Guttman et al., February 1999). However, these mechanisms only apply to the validation of the source address of an IP packet.

SAVI (Source Address Validation Improvements) solutions have also been proposed, but these solutions do not validate the IP addresses/prefixes indicated in the content ("payload") of the protocols using references (e.g. SDP (Session Description Protocol), SIP (Session Initiation Protocol), or DOTS).

Thus, the techniques of the prior art have at least one of the following disadvantages:
  the address validation is based on the source address of a packet,
  the available databases, for example a database managed by a RIR (Regional Internet Registry), are populated by the owners of the IP resources (namely, usually the operators) or only provide the identity of the owners of the IP resources,
  there is no IP resource validation solution deployed uniformly across the Internet by the various players—content and service providers and network operators,
  attacks intended to weaken the security of the communications or of the terminals connected to the Internet are still possible.

There is therefore a need for a new technique for verifying the validity of an IP prefix, or more generally of an IP resource, especially when the DPS service is hosted in the cloud.

3. SUMMARY OF THE INVENTION

The invention proposes a new solution for verifying the validity of an IP resource associated with a client domain, i.e. for verifying that an IP resource belongs to a client domain. For example, such an IP resource belongs to the group comprising:
  an IP address (for example, an IPv4 or IPv6 address),
  an IP prefix (for example, an IPv4 or IPv6 prefix),
  a domain name.

According to at least one embodiment, a method for verifying the validity of an IP resource associated with a client domain implements the following steps in a server, called an access control server:
  receiving a list of at least one IP resource associated with the client domain, transmitted from a client node of the client domain to the access control server;
  selecting at least one IP resource to be validated from the list; and verifying the validity of the selected IP resource(s), i.e. that the resource(s) is/are associated with said domain.

According to at least one embodiment, a method for declaring an IP resource associated with a client domain implements the following steps in a client node of the client domain:
  obtaining a list of at least one IP resource associated with the client domain; and
  transmitting the list to an access control server.

In a particular embodiment, the access control server is configured to verify that said at least one IP resource is associated with the client domain.

According to at least one embodiment, a method for processing a validation request for an IP resource associated with a client domain implements the following steps in a relay node of the client domain, associated with at least one IP resource selected by an access control server from a list of at least one IP resource associated with the client domain, previously transmitted from a client node of the client domain to the access control server:
  receiving or intercepting said request originating from the access control server, said request comprising a control message; and
  transmitting the request(s) to the client node.

According to at least one embodiment, a method for verifying the validity of an IP resource associated with a client domain implements the following steps in a validation server associated with at least one IP resource selected by an access control server from a list of at least one IP resource associated with the client domain, previously transmitted from a client node of the client domain to the access control server:
  receiving at least one request comprising an item of information representative of the identity of a client domain and of the selected IP resource(s),
  identifying the client domain based on the item of information representative of the identity of the client domain, and
  verifying the association of the selected IP resource(s) with the client domain, taking into account the identity of the client domain.

In a particular embodiment, the verification method further comprises transmitting a confirmation message or an error message to the access control server.

The proposed solution thus can verify that an IP resource is effectively (and legitimately) associated with a client domain.

In particular, if a client node of the client domain issues a request asking the access control server to perform an action on at least one other node identified by an IP resource, the proposed solution can verify whether the IP resource identifying at least one other node is actually associated with the client domain, for example allocated to at least one node of the client domain, or whether traffic to this IP resource is legitimately routed to this client domain.

Thus, in the context of a DDoS attack for example, the access control server can verify whether a mitigation or filtering request transmitted by a client node of the client domain actually concerns that client node or another node of the client domain, before taking actions so that suspicious traffic is no longer routed to the client domain.

Furthermore, according to at least one embodiment, the proposed solution does not require to use the infrastructures of the access provider. Thus, the proposed solution can verify the validity of an IP resource associated with a customer domain, whether the DPS mitigation service is hosted within the infrastructure operated by the access provider, in the cloud, or elsewhere.

According to at least one embodiment, the proposed solution can improve the reliability, robustness and/or effectiveness of the responses to DDoS attacks.

In particular, unlike current solutions based on the static consultation of databases, the method for verifying the validity of an IP resource according to at least one embodiment of the invention enables the real-time verification of the information relating to the allocation of IP resources to the clients, without disclosing their identity, including in a context of dynamic allocation of IP resources.

According to at least one embodiment, the list is updated periodically and/or in case of addition, deletion or modification of an IP resource associated with the client domain.

Thus, the proposed solution can validate an IP resource on a regular basis, and/or in case of addition, deletion or modification of an IP resource associated with the client domain.

In this way, in the context of a DOTS architecture for example, it is not necessary to wait for the reception of a filter installation request (such an installation could for example correspond to the response to an attack), which makes it possible to optimise the processing time of the DOTS requests.

Furthermore, according to at least one embodiment, it is possible to associate a validity period to the list of at least one IP resource associated with the client domain, to each of the IP resources or even several IP resources. In this case, the access control server can automatically delete the IP resource(s) concerned from its tables when the validity period expires.

In particular, a client node can update the list of IP resources associated with the client domain without waiting for the validity period to expire.

In this way, it is possible to detect that a resource validation is obsolete, which is notably interesting in the case of networks with frequent renumbering (i.e. the IP addresses or prefixes allocated to the network nodes are frequently modified). For example, as part of a mitigation request, if a node of a client domain asks the access control server to filter (incoming) traffic to the prefix 1.2.3.0/24 associated with the client domain at time T0, the access control server must verify at time T1 that the prefix 1.2.3.0/24 is still associated with the same client domain to decide whether it should filter or route traffic to that prefix 1.2.3.0/24.

According to a particular characteristic of the invention, the method for verifying the validity of an IP resource also takes into account at least one previously defined data filter rule. Other embodiments of the invention relate to associated access control server, client node, relay node, and validation server.

In another embodiment, the invention relates to one or more computer programs comprising instructions for implementing a method for verifying the validity of an IP resource associated with a client domain according to at least one embodiment of the invention, one or more computer programs comprising instructions for implementing a method for declaring an IP resource associated with a client domain according to at least one embodiment of the invention, one or more computer programs comprising instructions for implementing a method for processing at least one validation request for an IP resource associated with a client domain according to at least one embodiment of the invention, when said program(s) is/are executed by a processor.

In yet another embodiment, the invention relates to one or more information mediums, irremovable, or partially or totally removable, computer-readable, and comprising instructions from one or more computer programs for executing the steps of the method for verifying the validity of an IP resource associated with a client domain, and/or of the method for declaring an IP resource associated with a client domain, and/or of the method for processing at least one validation request for an IP resource associated with a client domain according to at least one embodiment of the invention.

The methods according to the invention can therefore be implemented in various ways, notably in wired form and/or in software form.

4. LIST OF FIGURES

Other characteristics and advantages of the invention will emerge more clearly upon reading the following description of a particular embodiment, provided as a simple illustrative non-restrictive example, and the annexed drawings, wherein.

5. DESCRIPTION OF AN EMBODIMENT OF THE INVENTION 5.1 General Principle

The general principle of the invention is based on a declaration to a server, called an access control server, of the IP resources associated with a client domain, and on a verification of the validity of these IP resources, i.e. verifying that the declared resources are actually associated with the client domain.

Figure 1:
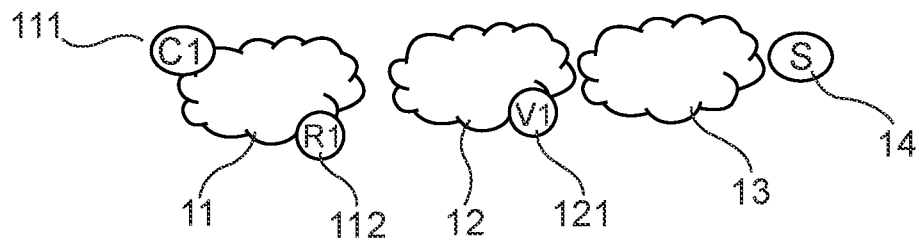
FIG. 1 shows an example of a communication network implementing a method for verifying the validity of an IP resource associated with a client domain, according to one embodiment of the invention.

In relation to FIG. 1, different equipment of a communication network implementing a method for verifying the validity of an IP resource associated with a client domain is presented.

For example, a client node C1 111, belonging to a client domain 11, communicating with an access control server S 14, is considered. For example, client domain 11 contains one or more machines, also called nodes. In particular, the client domain comprises at least one relay node R1 112. The term "domain" is used here to refer to a set of machines or nodes under the responsibility of the same entity.

A first access provider 12 has equipment allowing the clients of the client domain 11 to access the Internet network 13 to which the access control server 14 is connected. According to at least one embodiment, the first access provider 12 comprises at least one validation server V1 121. According to the example illustrated, the access control server 14 does not belong to the client domain 11, and can therefore be connected to the Internet network 13 via a second access provider. In another example not illustrated, the access control server 14 can belong to the client domain, or to another domain connected to the Internet network 13 via the first access provider 12.

Figure 2:
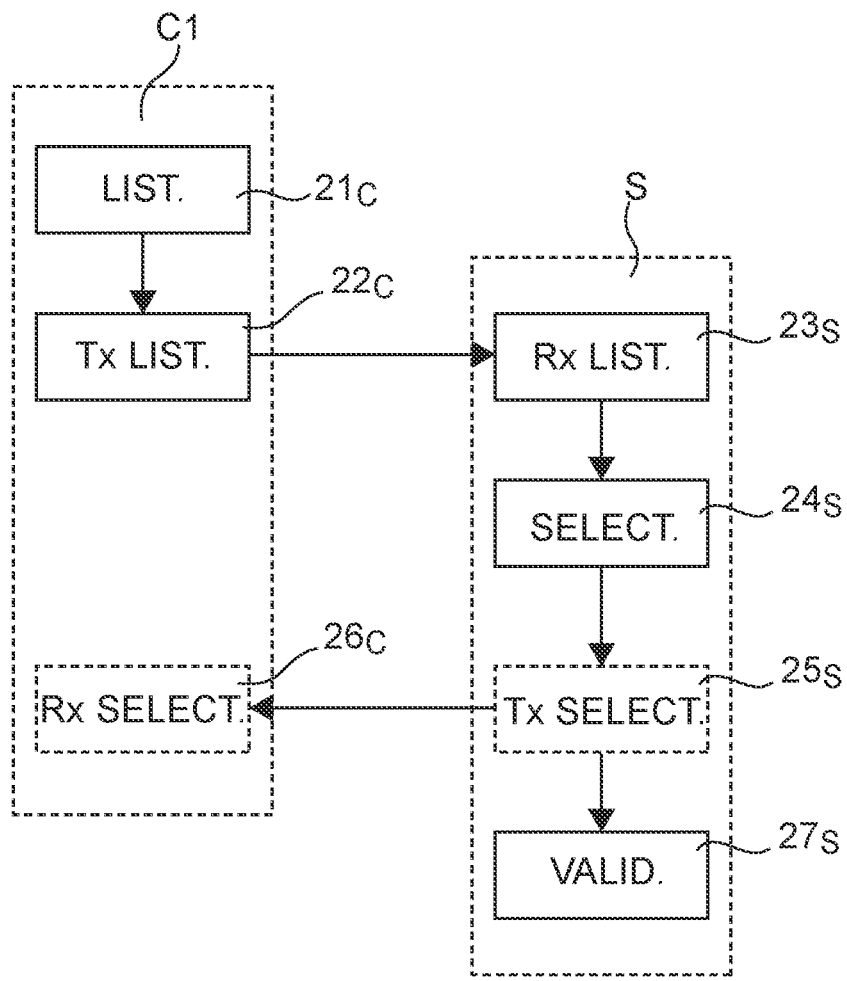
FIG. 2 shows the main steps of the method for verifying the validity of an IP resource associated with a client domain according to at least one embodiment of the invention.

FIG. 2 illustrates the main steps implemented for verifying an IP resource associated with a client domain 11.

A node of the client domain 11, for example the client node C1 111, obtains ($21_C$) a list of at least one IP resource associated with the client domain 11. For example, such a list comprises the IP addresses of the different nodes of the client domain 11, an IP prefix associated with a connection router of the client domain 11, a domain name associated with the client domain 11, etc.

The client node C1 111, or possibly another node of the client domain 11, transmits ($22_C$) this list to a server, for example the access control server 14. In other words, the client node C1 111 declares to the access control server 14 the IP resources associated with client domain 11. The source address is therefore the address of the client node, but the IP resources to be validated are those transmitted to the access control server, in the content of the message. The declaration of the IP resources can be explicit (using a dedicated message) or implicit (as part of a signalling or filtering request).

According to a first example, the list of at least one IP resource associated with the client domain is transmitted in a single message. In this case, a single request, called an aggregated request, can be issued to the access control server.

According to a second example, the list of at least one IP resource associated with the client domain is distributed across a plurality of messages. In this case, several separate requests can be issued to the access control server.

The access control server 14 then receives ($23_S$) the list of at least one IP resource associated with the client domain 11, transmitted from a client node of the client domain 11 to the access control server 14.

The access control server 14 selects ($24_S$) at least one IP resource to be validated from the list.

Possibly, the access control server 14 transmits ($25_S$) the selected IP resource(s) to the client node C1 111. The client node C1 111 then receives ($26_C$) the IP resource(s) selected by the access control server 14.

The access control server 14 then verifies ($27_S$) the validity of said at least one selected IP resource. In other words, the access control server verifies whether the selected IP resource is actually associated with the client domain 11.

Figure 3:
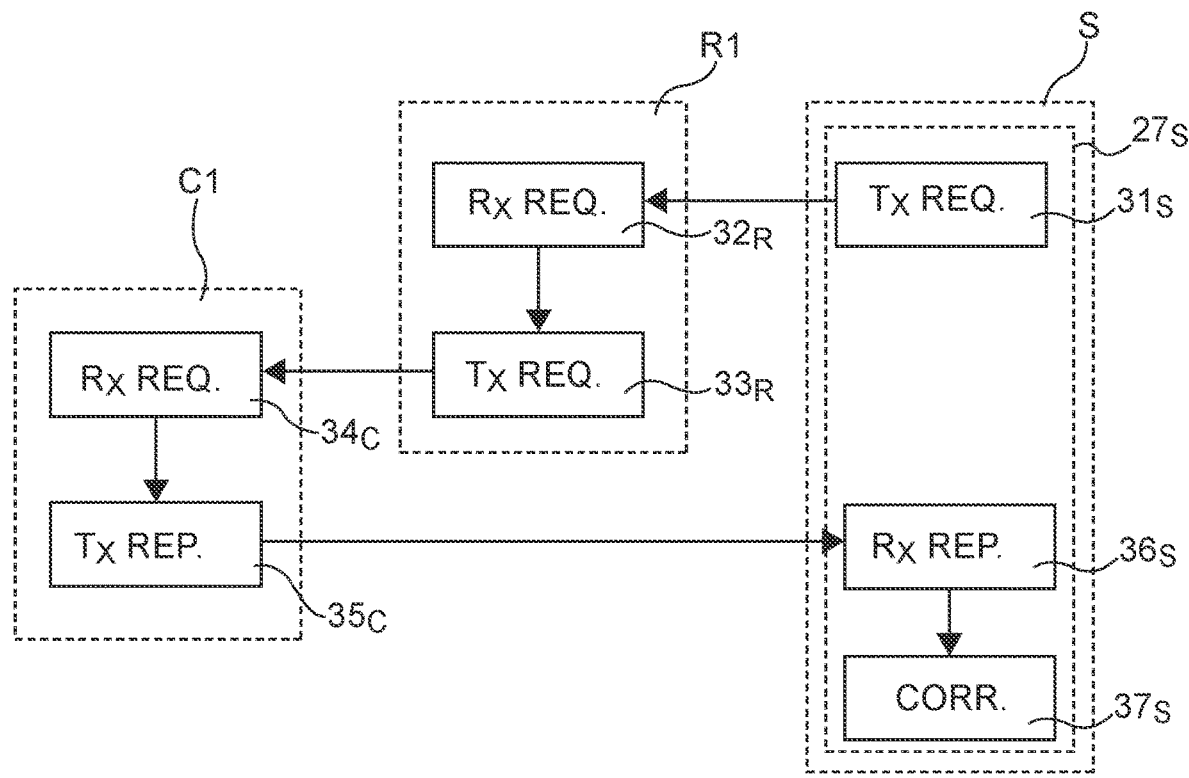
FIGS. 3 and 4 show two embodiments of the invention.
Figure 4:
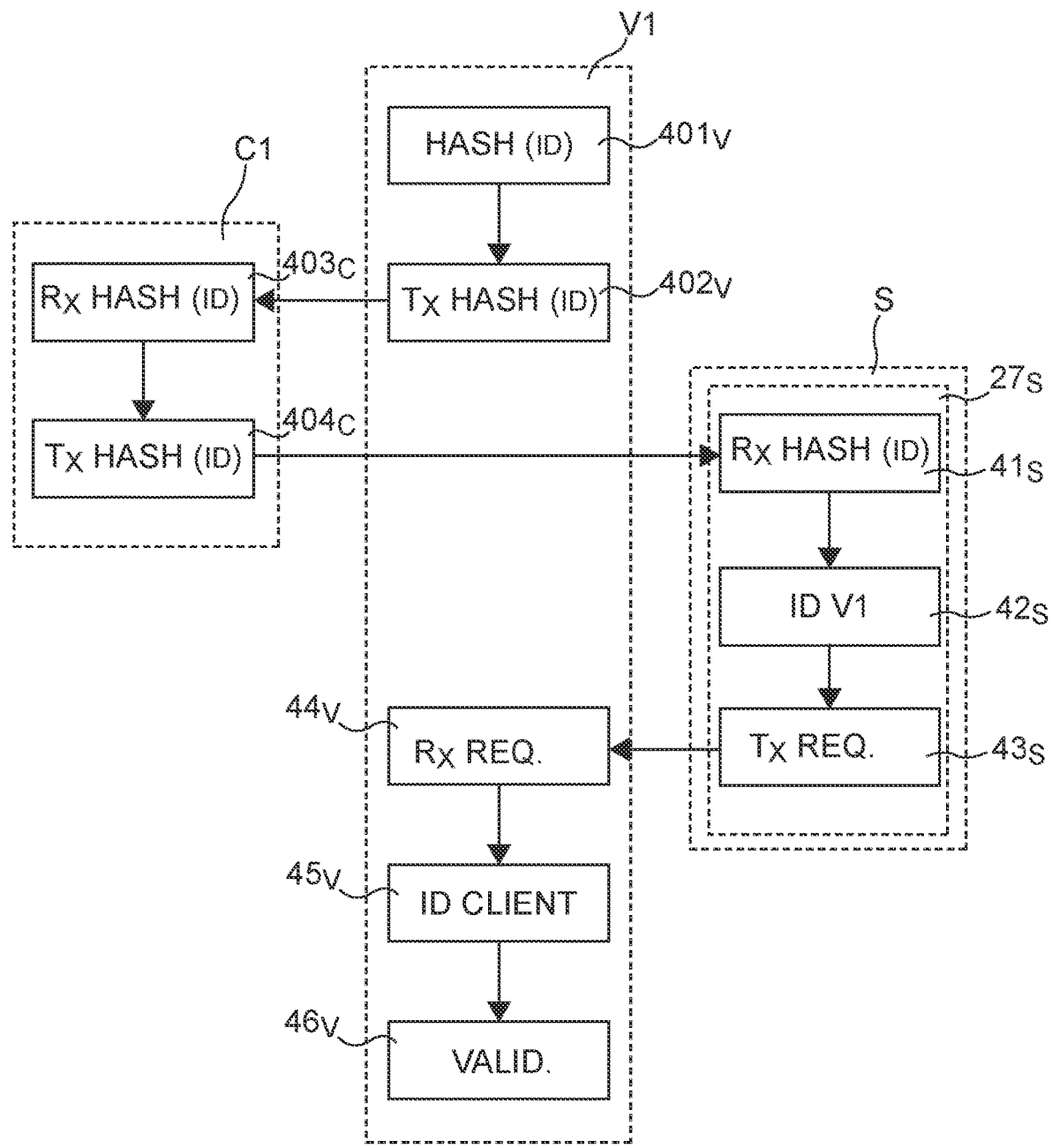

FIGS. 3 and 4 illustrate two embodiments of the invention. The first embodiment enables to free oneself from the access provider managing the client domain for validating of the IP resources associated with this client domain. The second embodiment allows the use of the access provider's equipment for validating the IP resources associated with a client domain, while keeping the identity of the client domain confidential.

FIG. 3 shows the main steps of the method for verifying the validity of an IP resource according to the first embodiment.

According to this embodiment, the verification ($27_S$) of the validity of the selected IP resource(s), implemented by the access control server 14, is based on the transmission ($31_S$) of at least one request to said IP resource to be validated, received or intercepted by at least one relay node of the client domain associated with said at least one selected IP resource, for example, the relay node R1 112. Possibly, the relay node R1 112 and the client node C1 111 are the same. As a variant, the relay node R1 112 and the client node C1 111 are two distinct nodes belonging to the same domain. Similarly, the client node and the relay node can be two software instances embedded in the same physical node.

More specifically, the selected IP resource can be an IP address. In this case, the access control server transmits the request to the IP address. The selected resource can also be an IP prefix. In this case, the access control server transmits the request to one or more addresses extracted from this prefix; these requests will typically be intercepted by the router(s) connecting the client domain to the Internet. The selected resource can also be a domain name. In this case, the access control server can implement a resolution procedure (for example, DNS) to obtain the IP address of the managing entity of the associated domain (access provider).

Such a request comprises a control message or data. In particular, such a control message can be associated with any item of information unambiguously identifying the request. This control message must notably not be trivial to avoid its spoofing. For example, such a control message is generated randomly.

The relay node R1 112 then intercepts ($32_R$) at least one request originating from the access control server 14, and comprising the control message. The request can be destined directly for the relay node if the destination address is allocated to the machine where the relay node resides.

The relay node R1 112 transmits ($33_R$) the request(s) to the client node C1 111, i.e. relays the request(s) originating from the access control server 14.

The client node C1 111 then receives ($34_C$) at least one request originating from the access control server, and comprising the control data or message, via at least one relay node of the client domain associated with at least one IP resource, selected by the access control server from the list.

In particular, if the relay node R1 112 and the client node C1 111 are two distinct nodes belonging to the same domain, the exchanges between the relay node R1 112 and the client node C1 111 can be implemented via a secure connection.

If the relay node R1 112 and the client node C1 111 are the same node, the client node C1 111 directly receives the request originating from the access control server 14, or the request is relayed internally.

The client node C1 111 responds by transmitting ($35_C$) to the access control server 14 a response including an item of information characteristic of the control data or message.

The access control server 14 receives ($36_S$) the response including the item of information characteristic of the control message, originating from the client node C1 111. The item of information characteristic of the control message can be identical to or different from the control message.

The access control server 14 performs a correlation ($37_S$) of the request and the response, or more specifically of the control data conveyed in the request and the item of information characteristic of the control data conveyed in the response, and validates whether or not the selected IP resource belongs to the client domain.

The main steps of the method for verifying the validity of an IP resource according to the second embodiment are now described in relation to FIG. 4.

This second embodiment involves a validation server associated with the access provider, for example the validation server V1 121 associated with the first access provider 12 of the client domain 11.

More specifically, according to this second embodiment, the verification ($27_S$) of the validity of the selected IP resource(s), implemented by the access control server 14, is based on the reception ($41_S$) of an item of information representative of the identity of the client domain. For example, such an item of information is representative of the identity of the customer domain or of the entity that manages the client domain, such as a subscriber to a connectivity service. In particular, such an item of information is a digest, or "hash", of the identity of the client domain 11 or of the entity that manages the client domain.

The access control server S 14 also implements the identification ($42_S$) of at least one validation server associated with the IP resource(s) selected in step $24_S$, for example the validation server V1 121.

Finally, the access control server S 14 transmits ($43_S$) to the identified validation server(s) at least one request comprising on the one hand the item of information representative of the identity of the client domain and on the other hand the selected IP resource(s). According to this second embodiment, the request is therefore not sent to a destination address extracted from an IP prefix or from a list of IP addresses to be validated, but to a validation server.

Possibly, such a request comprises a control message associated with any item of information unambiguously identifying the request. As with the first embodiment, such a control message can be generated randomly.

The validation server V 121, associated with at least one IP resource selected by the access control server 14 from the list of at least one IP resource associated with the client domain (list previously sent by the client node C1 111 to the access control server S 14), receives ($44_V$) the request(s) comprising on the one hand an item of information representative of the identity of the client domain, and on the other hand the selected IP resource(s).

Based on the item of information representative of the identity of the client domain, the validation server V 121 can identify ($45_V$) the client domain.

Finally, the validation server V 121 can verify ($46_V$) whether the selected IP resource(s) is/are associated with/belong(s) to the client domain, taking into account the identity of the client domain.

Prior to the implementation of the verification ($27_S$) of the validity of the IP resource(s) selected by the access control server 14, the validation server V1 121 can implement the determination ($401_V$) of an item of information representative of the identity of the client domain 11, directly or at the request of a client of the client domain. As indicated above, such an item of information is representative of the identity of the client domain or of the entity that manages the client domain, and can take for example the form of a digest of the identity of the client domain 11.

The validation server V1 121 transmits ($402_V$) to the client domain 11, for example to the client node C1 111, the item of information representative of the identity of the client domain.

The client node C1 111 then receives ($403_C$) the item of information representative of the identity of the client domain from the validation server attached to the client domain 11, and can transmit it ($404_C$) to the access control server 14, directly or at the request of the access control server 14.

It is noted that these preliminary steps for receiving 401y and transmitting $402_V$/receiving $403_C$ an item of information representative of the identity of client domain 11 can be implemented during an initialisation phase, or when a client domain 11 is connected to a network activating a validation server, or when a mitigation procedure is initiated, etc.

5.2 Application Examples in the Domain of Mitigation Services (DPS)

A description is given below of embodiments of the invention in a DOTS-type architecture, according to which the client node C1 111 is a DOTS client and the access control server S 14 is a DOTS access control server, allowing the client node C1 111 to inform the access control server S 14 that the client domain is under a DDoS attack and that appropriate actions are required. The client node C1 111 and the access control server S 14 can thus communicate via the DOTS signal and data channels defined in connection with the prior art.

In particular, at least one embodiment of the invention can be implemented to verify the validity of the IP resources associated with a client domain when the DPS mitigation services are not hosted within the infrastructures operated by the access provider connected to the client domain (i.e. if the DOTS access control server is not operated by the access provider connected to the client domain), but in the infrastructures operated by another access provider or in the "cloud".

5.2.1 Reminders of DOTS Architecture

A DOTS request can be, for example:
- an alias management message, for example to associate an identifier with one or more network resources located in the client domain,
- a signalling message to request the mitigation of a denial of service attack from a DOTS access control server, with the access control server being able, upon reception of such a message, to initiate the actions necessary to stop the attack, or
- a filter rule management message, such as requesting a DOTS access control server to install (or have installed) an access control list (ACL).

A DOTS request can be sent from a DOTS client, belonging to a DOTS client domain, to a DOTS access control server or a plurality of DOTS access control servers.

A DOTS domain can support one or more DOTS clients. In other words, several client nodes of a client domain can have DOTS functions.

DOTS communications between a client domain and an access control server can be direct, or established via DOTS gateways. These gateways can be hosted within the client domain, the access control server domain, or both. In other words, a node of the client domain can communicate directly with the access control server, or transmit a request to a gateway of the client domain that communicates directly with the access control server or to a gateway of the server domain, or transmit a request to a gateway of the server domain that communicates with the access control server.

A DOTS gateway located in a client domain is considered by a DOTS access control server as a DOTS client.

A DOTS gateway located in a server domain is considered by a DOTS client as a DOTS access control server. If there is a DOTS gateway in a server domain, the authentication of the DOTS clients can be entrusted to the DOTS gateway of the server domain. A DOTS access control server can be configured with the list of active DOTS gateways within its domain and the access control server can delegate some of its functions to these trusted gateways. In particular, the access control server can securely use the information provided by a gateway on a list declared to and maintained by the access control server by means of an ad hoc authentication procedure (for example, explicit configuration of the list by the authorised administrator of the access control server, retrieval of the list from an authentication server such as an AAA server (for "Authentication, Authorisation and Accounting, etc.).

The embodiments presented below can be implemented regardless of the configuration of the DOTS architecture (one or more DOTS clients in a client domain, no DOTS gateway, one or more DOTS gateways of the client domain or in the server domain, client domain separate from the server domain, etc.).

The establishment of a secure DOTS session can be done in accordance with the procedure described in the above-mentioned document "Distributed Denial-of-Service Open Threat Signaling (DOTS) Signal Channel Specification". For example, sessions can be established using a procedure described in one of the following documents:

"*Datagram Transport Layer Security Version* 1.2", Rescorla E. et al, RFC 6347, DOI 10.17487/RFC6347, January 2012, "*The Datagram Transport Layer Security (DTLS) Protocol Version* 1.3", Rescorla E. et al, draft-ietf-tls-dtls13-22, November 2017, "*The Transport Layer Security (TLS) Protocol Version* 1.2", Dierks T. et al, RFC 5246, DOI 10.17487/RFC5246, August 2008, and "*The Transport Layer Security (TLS) Protocol Version* 1.3", Rescorla E., draft-ietf-tls-tls13-23, January 2018.

In the following, it is assumed that the DOTS agents (client(s), access control server(s)) authenticate each other. There is therefore a secure communication channel, for example of the type (D) TLS, between a DOTS client and a DOTS access control server.

Thus, the messages received from another server imitating the legitimate access control server can be rejected by a DOTS client. Similarly, the requests from the DOTS clients not authorised to access the mitigation service can be ignored by the DOTS access control server. It is assumed in what follows that this procedure is implemented by the DOTS agents.

The details of (D) TLS exchanges, and those concerning the management of security keys for mutual authentication of DOTS agents, are not the subject of the present invention and are not detailed here.

The various steps implemented by a DOTS client and a DOTS server are described below, with reference to FIG. 2. It is considered as an example that the client node 111 in FIG. 1 is a DOTS client and that the access control server 14 in FIG. 1 is a DOTS server. The client domain is therefore a DOTS domain.

5.2.2 Declaring the List of IP Resources Associated with a Client Domain

With reference to FIG. 2, the DOTS client obtains (21$_C$) a list of at least one IP resource associated with the DOTS domain, and then transmits it (22$_C$) to one or more DOTS access control servers, for example using the DOTS data or signal communication channels. A DOTS client can therefore declare to the DOTS access control server the IP resources it manages, or more generally the IP resources that are associated with the DOTS client domain.

One advantage of such a declaration of IP resources is that it can initiate the verification of the validity of the associated IP resources without waiting for the reception of a DOTS request and therefore without waiting for an attack to be in progress. As a result, the signalling messages transmitted from the DOTS client to the DOTS access control server to request the mitigation of a denial of service attack can be processed rapidly.

As already mentioned, IP resources can be IP addresses, IP prefixes or domain names. The domain names can be resolved to IP addresses. The IP prefixes below denote IP prefixes directly communicated by a DOTS client or addresses retrieved via a name resolution system (e.g. DNS). The prefixes can be of the same address family or belong to distinct families (IPv4, IPv6). The IP prefixes are not necessarily contiguous, nor managed by the same access provider. Moreover, these prefixes can be PA (Provider Assigned) prefixes, i.e. prefixes owned by the service provider, or PI (Provider Independent) prefixes, i.e. prefixes allocated at the request of a customer, for example by a regional Internet registry (RIR), independently of the access provider.

Figure 5:
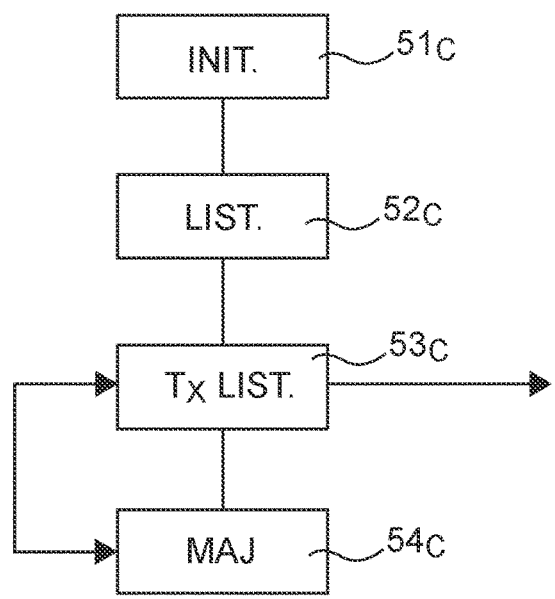
FIG. 5 shows the main steps implemented by a DOTS client for declaring IP resources associated with a DOTS domain according to one embodiment.

The main steps implemented by the DOTS client for declaring the IP resources associated with a DOTS domain are described below in relation to FIG. 5.

During an initialisation step 51$_C$, secure communication channels between the DOTS client and one or more DOTS access control servers are established.

During an obtaining step 52$_C$, similar to step 21$_C$, the DOTS client obtains the list of IP resources it manages, or more generally, the list of IP resources associated with its DOTS (client) domain.

During a transmission step 53$_C$, similar to step 22$_C$, the DOTS client declares the list of IP resources, by transmitting it to one or more DOTS access control servers.

During an update step 54$_C$, the DOTS client verifies the validity of the entries in the list or discovers new resources. This update step can be implemented periodically, and/or each time an IP resource associated with the domain is added, modified, or deleted. Once the list is updated, the list is transmitted back to the DOTS access control server according to transmission step 53$_C$. This transmission can be implemented periodically or as soon as the list is updated.

When transmitting the list of IP resources to the access control server(s), the DOTS client can specify the validity period associated with that list, or with certain IP resources in that list, for example in a "Lifetime" field. Such a validity period is expressed in minutes, for example.

If the client does not renew its declaration/list before the validity period defined in the initial declaration request expires, the DOTS access control server can automatically delete the associated IP resource(s) from its active prefix/resource tables for that client/client domain.

For example, the "Lifetime" field can show "−1" to indicate an indefinite validity period.

Figure 6A:
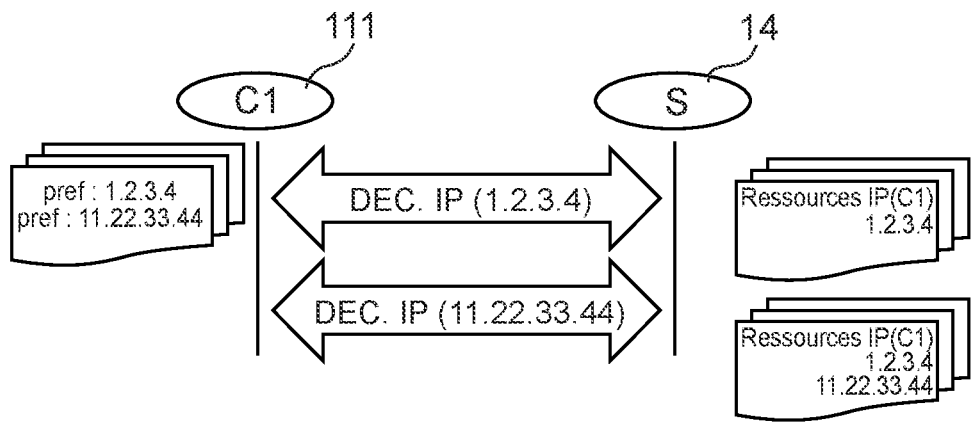
FIGS. 6A and 6B show two examples of IP resource declaration.
Figure 6B:
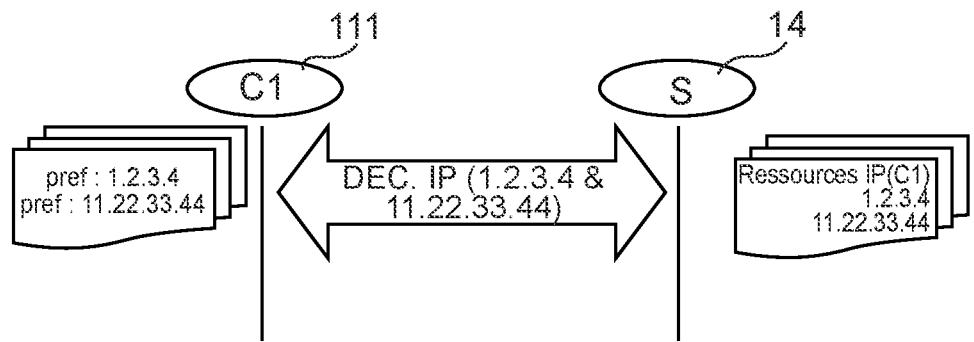

As illustrated in FIG. 6A, distinct requests can be issued by the DOTS client to declare to the access control server(s) each of the IP resources associated with the DOTS domain of the DOTS client (a first request to declare the address "1.2.3.4" and a second request to declare the address "11.22.33.44", for example). Optionally, as illustrated in FIG. 6B, a single request can be issued to declare all the IP resources associated with the DOTS domain of the DOTS client (a single request to declare the address "1.2.3.4" and the address "11.22.33.44", for example).

If several DOTS clients are deployed in a same domain, the IP resource declaration can be performed by only one or several clients. In other words, the declarations are associated by default with the domain and not with a DOTS client.

A DOTS access control server can identify the DOTS clients of the same domain. To do this, the DOTS access control server relies on the security keys used for the authentication, such as the SPKI (Subject Public Key Information) of a certificate associated with the DOTS client (for example, the X.509 certificate, as defined in the RFC 5280 document entitled "Internet X.509 Public Key Infrastructure Certificate and Certificate Revocation List (CRL) Profile", D. Cooper et al. May 2008), or the PSK Identity (shared key identifiers) used by the clients during the authentication procedure ("TLS ClientKeyExchange").

A program example for declaring the prefix "1.2.3.0/24" of a DOTS client to its DOTS access control server is described below. The "POST" message is used for illustration purposes, but other messages can of course be used (for example, "HTTP PUT"):

```
POST / restconf/data/ietf-dots-data-channel:dots-data\
      /dots-client=mydotsclient HTTP/1.1
Host: {host}:{port}
Content-Type: application/yang-data+json
{
   "ietf-dots-data-channel:prefixes ": {
      "prefix-list": [
         {
            "name": "my_first_prefix",
            "prefix": "1.2.3.0/24",
            "lifetime": 1504
         }
      ]
   }
}
```

As indicated above, the list of IP resources associated with the client domain can be updated on a regular basis and/or each time an IP resource associated with the client domain is added/modified/deleted.

According to a first example, acquisition operations can result in the allocation and use of new IP resources, for example new prefixes that are managed by an active DOTS client. The DOTS client can declare such new prefixes. To do this, the DOTS client can, for example, send a POST message.

According to a second example, a DOTS client can also update the list of IP resources by deleting those that are no longer valid (for example, a prefix that is no longer delegated by the access network, or which validity period has expired).

In this case, the DOTS client can delete the IP resource(s) that is/are no longer valid without waiting for the validity period indicated at the time of the declaration to expire.

A program example for the deletion of the prefix "my_first_prefix" by a DOTS client is described below. Again, the "POST" message is used for illustration purposes, but other messages can of course be used (for example, "HTTP PUT"):

DELETE/restconf/data/ietf-dots-data-channel: dots-data\
   /dots-client=mydotsclient
   /prefixes/prefix-list=my_first_prefix HTTP/1.1
Host: {host}: {port}

5.2.3 Selecting the IP Resources to be Validated by a DOTS Access Control Server Once the IP resources associated with a domain have been declared by the DOTS client to a DOTS access control server, the DOTS access control server can verify that the declared resources are actually associated with the declaring client domain.

To do this, the DOTS access control server can select one or more IP resources to be validated from the list (step $24_S$ with reference to FIG. 2), and then apply a verification procedure to each of the selected IP resources.

Possibly, the verification procedure applies to other entries maintained by the access control server (for example, filter entries, or entries of other clients belonging to the same domain).

In particular, generalising the verification procedure to other types of entries maintained by an access control server is interesting for the clients that do not support the IP resource declaration procedure. It is indeed possible to verify the validity of the IP resources managed by a customer that is not able to implement the IP resource declaration procedure, if another client of the domain has previously declared all the IP resources associated with this domain.

Different selection examples of IP resources to be validated by a DOTS access control server are describe below:

the DOTS access control server can systematically perform the verification procedure upon reception of a client declaration, or during the validity period of the filter or signal rules, or both;

the DOTS access control server can implement the verification procedure periodically to ask the DOTS clients to confirm the validity of the filter rules, particularly the destination addresses specified in the filter rules;

the access control server can select all or part of the entries to be validated; to do this, the access control server performs a selection procedure, such as random mode, selection of entries that have exceeded a certain lifetime (while remaining theoretically valid by virtue of the value of the "Lifetime" parameter allocated by the access control server when the entry was created), etc.;

the DOTS access control server can implement the verification procedure upon detection of a conflict between the destination addresses indicated by clients belonging to distinct DOTS domains.

Figure 7:
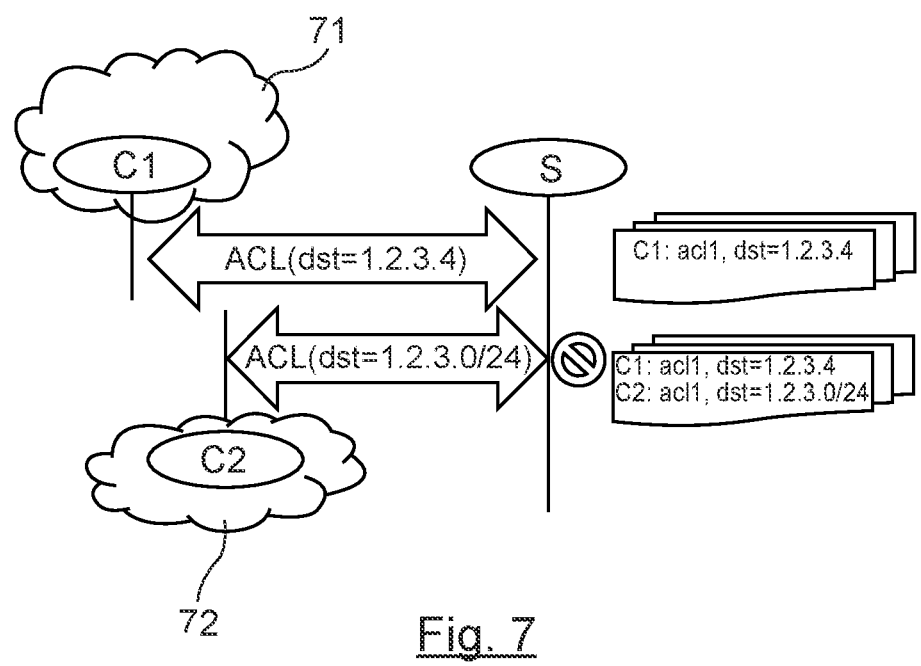
FIG. 7 shows the detection of an address conflict between several domains.

According to the latter example, illustrated in FIG. 7, a DOTS access control server can detect an address conflict between several domains by comparing the destination prefix(es) indicated in the DOTS requests. For example, a first client C1, belonging to a first domain 71, indicates the destination address "1.2.3.4/32" in a DOTS request, while this address is covered by the request of a second client C2, belonging to a second domain 72, for the prefix "1.2.3.0/24". Since the two clients C1 and C2 do not belong to the same domain, the access control server S can detect a conflict between the destination addresses and select no destination address as the "IP resource to be validated".

5.2.4 Validating the Selected IP Resources

Once the IP resources to be validated have been selected by the DOTS access control server, the DOTS access control server implements a validity verification of the selected resource(s) (step $27_S$ with reference to FIG. 2).

Figure 8:
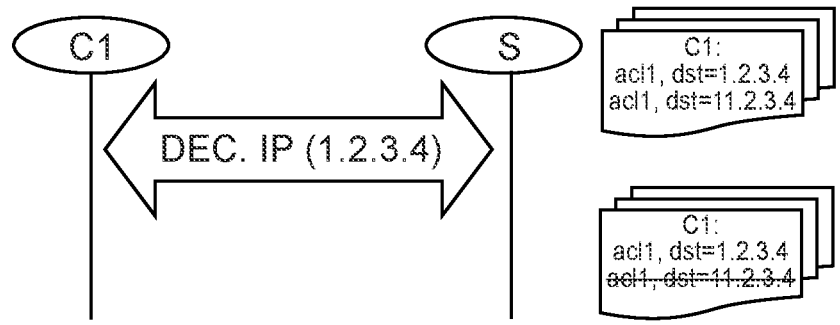
FIG. 8 shows the deletion of IP resources that are not part of the list declared by a DOTS client.

According to at least one embodiment, the DOTS access control server can, prior to or simultaneously with the verification procedure, delete the DOTS entries indicating IP resources that are not part of the list declared by a DOTS client. Thus, as illustrated in FIG. 8, if the client C1 declares the address "1.2.3.4" to the access control server S, and the DOTS entries contain the addresses "1.2.3.4" and "11.2.3.4", the access control server detects an abnormality in the filter rules associated with the client C1 and can delete the corresponding entries from its tables. Optionally, the access control server can send a notification to the client to account for the clean-up operation.

Figure 9:
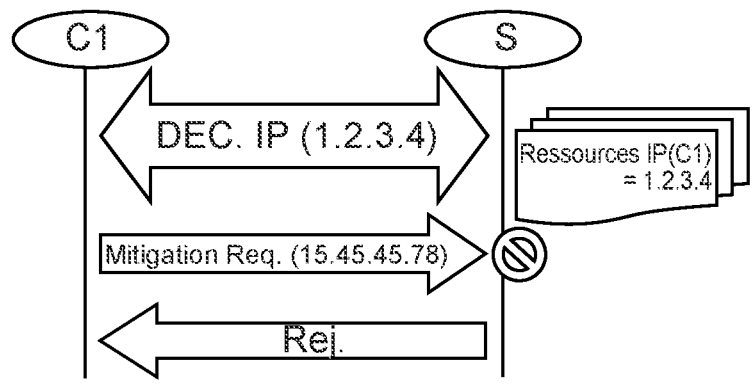
FIG. 9 shows the refusal of a mitigation request on an address that is not part of the list declared by a DOTS client.

Similarly, the DOTS requests indicating an IP resource that is not part of the declared IP resources can be rejected by the access control server, prior to or simultaneously with the verification procedure. Thus, as illustrated in FIG. 9, if the client C1 declares the address 1.2.3.4 to the access control server S, and the access control server receives a signalling/mitigation request on the address "15.45.45.78", the access control server can refuse the signalling request because the address indicated as the target of the attack in the request is not on the list of IP resources declared by the client C1 or the clients belonging to the same client domain.

Two embodiments for implementing the verification procedure consisting in verifying the validity of the selected resource(s) (step $27_S$ with reference to FIG. 2) are described below.

The first embodiment, known as "DOTS probing", which main steps are illustrated in FIG. 3, enables to free oneself from the access provider for validating the IP resources. The second embodiment, known as "Cooperating DOTS/ISPs", which main steps are illustrated in FIG. 4, enables the processing of the data maintained by an access provider without infringing on the privacy of the clients.

The first embodiment ("DOTS probing") is described in more detail below.

According to this first embodiment, at least one node of the client domain activates a "DOTS_CHECK_RELAY" function to inspect incoming traffic and redirect it to a client node. Such a node is called a "relay node" hereafter.

Several nodes of the client domain having the "DOTS_CHECK_RELAY" function can be solicited. For example, a client domain connected to the Internet network via several links ("Multi-homing" context) can activate the "DOTS_CHECK_RELAY" function on all the nodes connecting it to the Internet network.

A DOTS client can coexist with the "DOTS_CHECK_RELAY" function. In other words, a client node can activate the "DOTS_CHECK_RELAY" function, for example, when the DOTS client is embedded in a network connection router such as a residential gateway (CPE, Customer Premises Equipment). The client node is then a relay node. In this case, the DOTS client is advantageously located on the path of all traffic destined for the client domain.

It is assumed hereafter that a DOTS client has the list of relay nodes activating the "DOTS_CHECK_RELAY" function. This list of relays can contain one or more relays, and can be explicitly declared to the client (static configuration) or provided dynamically (for example, using the resources of a DHCP option). However, it is not necessary to communicate such a list of relays to the access control server. In addition to one or more addresses to reach a relay node and the security information (for example, authentication token to verify that the DOTS client is authorised to communicate with a relay node), additional information can be provided, such as the listening port number of the service or the list of IP resources managed by a relay node.

If no specification relating to the IP resources is provided for a relay in the list of relays, then a DOTS client can use this relay for all the IP resources associated with the domain.

The "DOTS_CHECK_RELAY" function is described in more detail below.

The "DOTS_CHECK_RELAY" function can be:
a software module dedicated to the DOTS service,
a traffic capture function activated on a node of the client domain, for example, one of the routers connecting the client domain to the Internet network.

According to a particular embodiment, the communication between the relays activating the "DOTS_CHECK_RELAY" function and the DOTS clients of the domain can be secured. For example, a relay activating the "DOTS_CHECK_RELAY" function can communicate information to or receive requests from duly authorised trusted clients.

Figure 10:
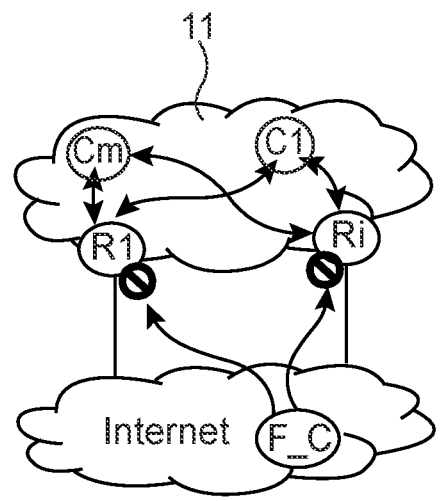
FIG. 10 shows the communications that are authorised or not between client nodes and relay nodes.

Thus, as illustrated in FIG. 10, messages originating from the clients C1 and Cm of the client domain 11 are authorised by the relays R1 and Ri, while messages from a spoof client "F_C" are rejected by the relays R1 and Ri.

According to a particular embodiment, the "DOTS_CHECK_RELAY" function can be activated upon request. According to this embodiment, the activation of this function is controlled by at least one DOTS client of the domain. The function is activated for a limited period; it is then deactivated. This embodiment is preferably used to associate a temporary address or prefix to the relay activating this function.

According to another embodiment, the "DOTS_CHECK_RELAY" function can be activated permanently. According to this embodiment, the "DOTS_CHECK_RELAY" function can be implemented by reusing the traffic capture functions. This embodiment is preferably used when the relay node activating the "DOTS_CHECK_RELAY" function is located on a path that routes some or all of the traffic destined for the client domain (for example, an Internet network connection router, such as a CPE). The use of temporary addresses/prefixes is not necessary for this mode.

The verification procedure according to the first embodiment ("DOTS probing") is described below.

As indicated previously in relation to FIG. 2, the access control server receives ($23_S$) a list of at least one IP resource associated with the client domain, and selects ($24_S$), from the list, one or more IP resources to be validated. It is noted that the content of this list can vary over time, since the list can be updated (step $54_C$ in FIG. 5).

For example, upon identification of a DOTS entry to be validated by the access control server, the latter extracts associated destination prefixes.

Optionally, the access control server communicates the list of selected IP resources (or associated IP prefixes/addresses) to the client (step $25_S$ in FIG. 2). For example, such a list can be communicated to the client when deploying a software module dedicated to the DOTS service that uses, for example, virtualisation techniques to dynamically instantiate service functions ("on-demand" mode above).

In particular, these service functions can be configured to intercept traffic intended for at least one of the addresses communicated by the DOTS access control server.

According to a particular embodiment, the client can configure the "DOTS_CHECK_RELAY" function(s) in accordance with the instructions of the access control server.

Possibly, the client can inform the access control server that the client domain is ready to process the IP resource validation messages.

Once the IP resources to be validated have been selected by the access control server, the access control server can implement the validity verification (step $27_S$) of the selected IP resource(s) or the associated addresses/prefixes.

To do this, according to this first embodiment ("DOTS Probing"), the access control server sends requests having as destination address the address to be validated (i.e. an address extracted from a selected IP resource), and intercepted by the identified relay node(s) (step $31_S$ in FIG. 3).

For example, "DOTS_PROBE_REQUEST" validation messages are transmitted to each of the addresses in the list of selected IP resources.

The access control server can send "DOTS_PROBE_REQUEST" validation messages as soon as the IP resources to be validated are selected, or after a certain period, or upon reception of a message from the client, for example a reception confirmation message when the access control server communicates the list of selected IP resources to the client ($25_S$).

Sending such messages to the node(s) identified by selected IP resource(s) can be done successively or simultaneously.

In particular, it is noted that such validation messages comprise a control message associated with any item of information unambiguously identifying the validation message.

For example, the DOTS access control server generates "DOTS_PROBE_REQUEST" messages with random payloads to prevent suspicious clients from easily guessing the messages and sending spoof responses. Thus, as an example, the access control server can:
- insert one or more unique identifiers, such as UUID (Universally Unique Identifier) identifiers—version 4 (as described in the RFC 4122 document "A Universally Unique IDentifier (UUID) URN Namespace", P. Leach, July 2005), generated randomly:
  1. 263afd79-835c-4ee7-9535-df245cf28d9a
  2. 246813cd-2bf3-46a9-ad1e-b4bb0f356189
  3. 730d0839-0267-4216-8b62-66844bb30711
  4. 61319aa3-555d-445c-8918-f2e9cfd67e06
- calculate one or more digests it inserts in the "DOTS_PROBE_REQUEST" message, such as SHA-256 digests:
  1. bd10ab3db20f6830feb53a8f295013e2934cdc674c323 43341445082a73830f7
  2. 00ba021fe38dc12c0ceefd709be9a2d08c8ebea3f231c7 85f25d03623ee566c5
  3. b9c8740f9a4f59c3311f2b027d055dfdd7ba3184754e7 451ed649e05cc779385
  4. b9e44df1b5f0dc788a068225f422b7cf1b4858b62188a 47b7504fe202c25e973
- use a technique to ensure the integrity and authenticity of the control message, for example of the type AEAD (Authenticated Encryption with Associated Data), as described in the RFC5116 document: "*An Interface and Algorithms for Authenticated Encryption*", D. McGrew, January 2008;
- use any other random generation procedure, such as those specified in the RFC4086 document entitled "*Randomness Requirements for Security*", D. Eastlake, January 2005;
- use a random file (for example, an image);
- etc.

For example, the generation of a "DOTS_PROBE_REQUEST" validation message by the DOTS access control server comprises:
- generating packets with random data (control data);
- defining the destination address (address of the relay node identified by the selected IP resource);
- maintaining a status characteristic of the transmission of said packets with random data;
- sending the message ($31_S$) to the relay identified by the selected IP resource.

The same message can be transmitted several times, particularly in the case where one of the messages has been destroyed when it was routed to its destination.

If the destination address extracted from the selected IP resource is not associated with the client domain, two cases should be considered by the access control server:
- either the access control server receives an error message (via the ICMP protocol, for example);
- or the access control server does not receive any response.

In both cases, the access control server can conclude that the address associated with the DOTS_PROBE_REQUEST message is not legitimately associated with the DOTS client. The access control server can thus invalidate the corresponding entries in its tables. Other actions can be taken, for example, blocking the DOTS client that indicated this address/prefix.

If the destination address is actually associated with the client domain, then at least one relay of the domain can intercept the DOTS_PROBE_REQUEST message(s) (step $32_R$ in FIG. 3). These messages can be explicitly destined for the relay (on-demand mode) or for the relays having an address of the domain. In both cases, these messages must be relayed ($33_R$) to the DOTS client. Preferably, the content of the DOTS_PROBE_REQUEST message is not modified by the relay.

Upon reception ($34_C$) of the DOTS_PROBE_REQUEST message by the client, the DOTS client sends ($35_C$) a DOTS_PROBE_REPLY response to the access control server. Preferably, the content of the message is not modified by the client. In particular, the response comprises an item of information characteristic of the control message.

Upon reception ($36_S$) of the DOTS_PROBE_REPLY message by the access control server, the access control server correlates ($37_S$) the response (DOTS_PROBE_REPLY) with the request (DOTS_PROBE_REQUEST) to verify the authenticity and the integrity of the message.

If the correlation was successful, the associated IP resource is validated.

For example, the processing of a "DOTS_PROBE_REPLY" response message by the DOTS access control server comprises:
- verifying that the issuer of the message is a legitimate DOTS client: if it is not the case, the corresponding IP resource is discarded;
- extracting the content of the response message (control message or item of information characteristic of the control message);
- controlling the message content integrity: if the content of the message is not correlated with the control message, the corresponding IP resource is discarded;
- verifying the content of the tables: if the IP resource does not match any of the entries in the table maintained by the access control server, then this corresponding IP resource is discarded;
- validating the corresponding IP resource.

Such steps can be repeated for all the selected addresses that need to be validated.

FIGS. 11 to 15 show embodiments of the verification procedure according to this first embodiment ("DOTS Probing").

Figure 11:
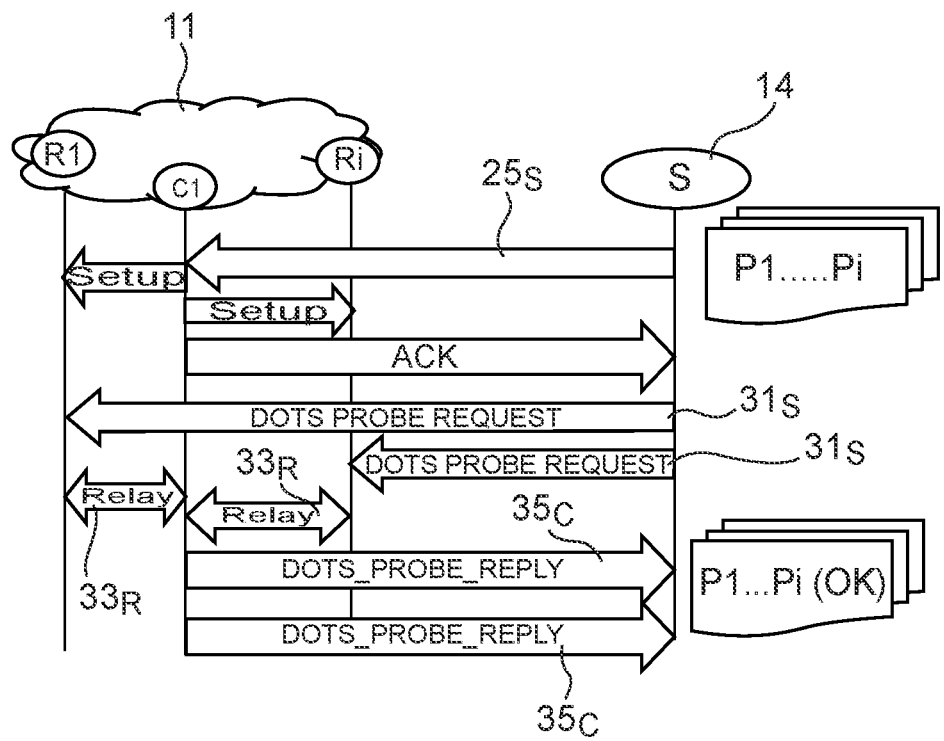
FIGS. 11 to 15 show embodiments of the verification procedure according to a first embodiment known as "DOTS Probing"

FIG. 11 illustrates an example of a successful validation of all the IP resources associated with a DOTS client. It is assumed in this example that the access control server 14 informs the client of the list of selected addresses to be validated ($25_S$), for example addresses P1 to Pi. It is recalled that this step is optional. Upon reception ($26_C$) of this list, the DOTS client configures ("Setup") required relays so that they are ready to receive the DOTS_PROBE_REQUEST validation messages. An "ACK" confirmation message can be sent by the DOTS client to the access control server to indicate that the client domain is ready. Then, the access control server can send ($31_S$) DOTS_PROBE_REQUEST validation messages to the relay(s) for each of the addresses to be validated. These messages are relayed ($33_R$) successfully by the relays R1 . . . , Ri to the DOTS client. The latter then transmits ($35_C$) the DOTS_PROBE_REPLY messages to the DOTS access control server. The latter verifies the integrity of the content of the message and, after consulting its tables, validates the addresses. These addresses are associated with this domain for a period of time configurable on the access control server. The status of the addresses P1 to Pi is therefore "validated".

Figure 12:
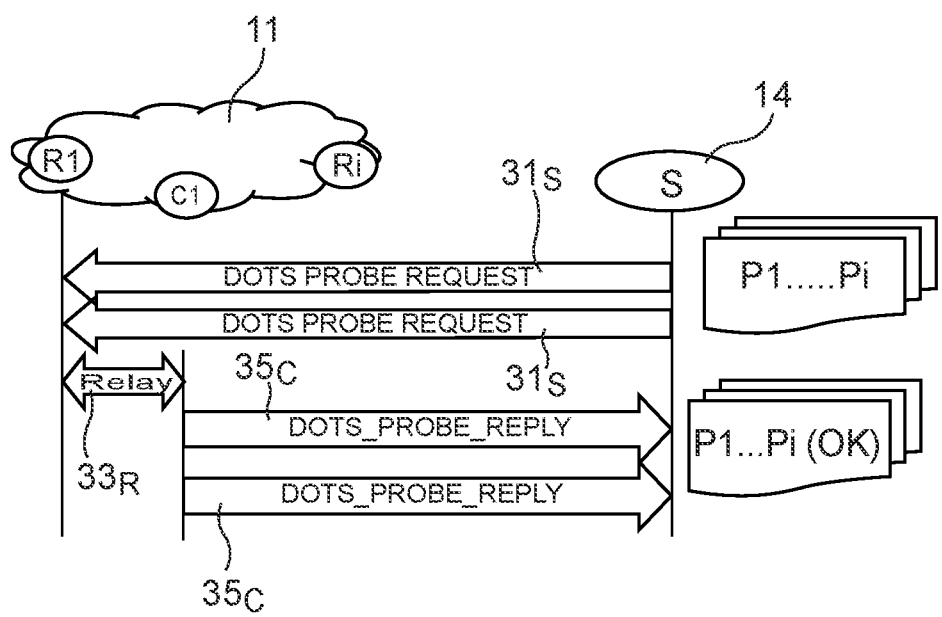

FIG. 12 illustrates another example of a successful validation of all the IP resources associated with a DOTS client. According to this second example, the DOTS_PROBE_REQUEST validation messages are transmitted ($31_S$) to the same relay and without prior notification to the client. The status of the addresses P1 to Pi is also "validated".

Figure 13:
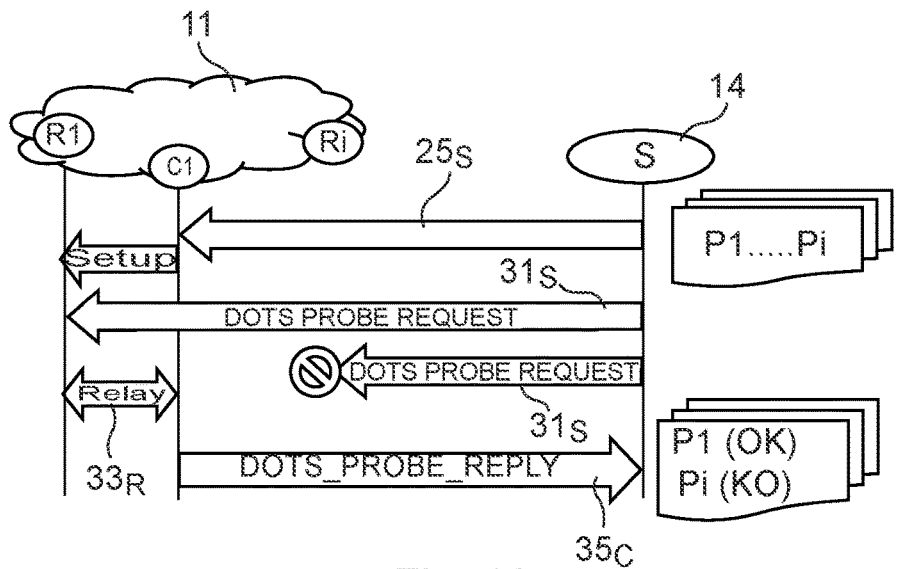

FIG. 13 illustrates an example of a partially successful address validation. Only the address P1 is validated while the address Pi is not. The status of the address P1 is therefore "validated" while the status of the address Pi is "not validated".

In particular, it is noted that if no response is received from the client, or if the received response has not been validated, the access control server concludes that this IP resource is not associated with this DOTS client domain. It thus deletes said address from its tables.

Figure 14:
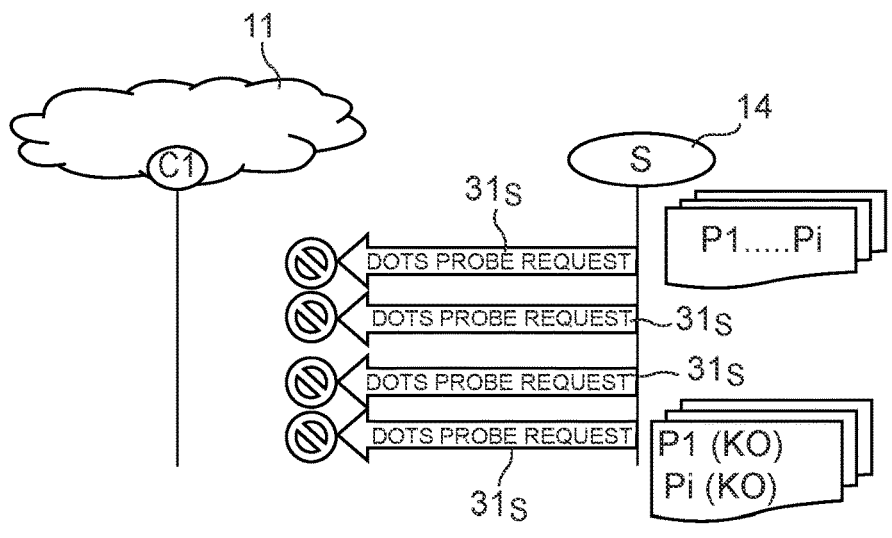

FIG. 14 shows an example of a failed address validation, in the case where the access control server does not receive any response to the DOTS_PROBE_REQUEST messages. The status of the addresses P1 and Pi is therefore "not validated".

Figure 15:
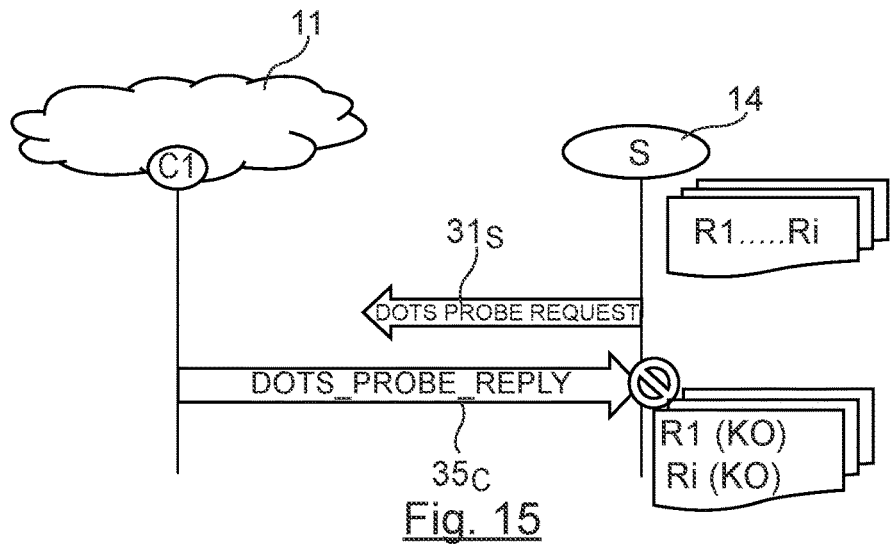

FIG. 15 illustrates another example according to which a client generates DOTS_PROBE_REPLY response messages to simulate that relays in its domain have actually received DOTS_PROBE_REQUEST validation messages. These DOTS_PROBE_REPLY messages are not validated by the access control server because the payloads of the DOTS_PROBE_REQUEST and DOTS_PROBE_REPLY messages are not correlated.

The second embodiment ("Cooperating DOTS/ISPs") for verifying the validity of the selected resource(s) (step $27_S$ with reference to FIG. 2) is now described.

This second embodiment consists in soliciting access providers to verify that an address or a prefix declared by a DOTS client is actually allocated by that provider to that client. This embodiment assumes that the access providers expose a programming interface (API) to offer value-added services such as IP resource validation to third parties. Also, and in order to preserve the confidentiality of the data of the clients, some items of information are not disclosed to these third parties, or only with the explicit consent of the clients. In addition, and in order to avoid data spoofing, the information of the clients is not transmitted to the third parties.

The steps for receiving ($23_S$), by the access control server, a list of at least one IP resource associated with the client domain, selecting ($24_S$) at least one IP resource to be validated from the list, and optionally transmitting ($25_S$) the selected IP resource(s) to be validated to the DOTS clients, are also implemented according to this second embodiment, and are similar to those implemented according to the first embodiment.

As for the step for verifying ($27_S$) the validity of the selected IP resource(s), it involves one or more validation servers.

More specifically, as illustrated in FIG. 4, the access control server receives ($41_S$), according to this second embodiment, an item of information representative of the identity of the client domain or of the entity that manages the client domain.

For example, the DOTS access control server retrieves the identity of the provider(s) owning the IP resource. Such information can indeed be publicly available. To do this, the access control server queries, for example, the European IP Networks (Réseaux IP Européens, RIPE) database.

An example of a request using the RIPE database resources to retrieve the identity of the client domain or of the entity that manages the IP resource "80.12.102.157" of the client domain is given below:
https://apps.db.ripe.net/db-web-ui\
/#/query?searchtext=80.12.102.157#resultsSection As indicated above, this second embodiment assumes that the access providers expose a programming interface (API) for the validation of IP resources, for example in one or more validation servers hosted by these access providers. The validation server addresses are also accessible/available to the clients of these access providers.

If the access providers expose said API for the validation of IP resources, and if the RIPE base is modified to specify the validation server(s), the response to this request indicates that the IP resource "80.12.102.157" is allocated, according to this example, to the access provider "Orange S.A." and that the validation server(s) for this IP resource are located by the addresses "80.12.102.15" and "80.12.102.16".

An example of a response to the request is given below:
Responsible organisation: Orange S.A.
inetnum: 80.12.102.144-80.12.102.159
validation server(s): 80.12.102.15, 80.12.102.16
netname: VISION
descr: France Telecom NDC
country: FR
admin-c: FTO9-RIPE
tech-c: FTO9-RIPE
status: ASSIGNED PA
mnt-by: FT-BRX
created: 2014-11-20T10:56:45Z
last-modified: 2018-02-09T15:00:11Z
source: RIPE The steps implemented for validating a selected IP resource are described in more detail below.

The DOTS access control server communicates ($25_S$) to the DOTS client, optionally, the selected IP resource, or the list of selected IP resources. The DOTS access control server also identifies ($42_S$) the owner of the resource and at least one associated validation server.

Once the list is received ($26_C$) by the DOTS client, the latter establishes a secure communication with a validation server managed by the access provider of the client to retrieve an item of information representative of the identity of the client domain or of the entity that manages the client domain. For example, the validation server determines ($401_V$) a unique digest of the client domain identity. A validity period can be assigned to the digest.

Such a digest can easily and unambiguously identify a client domain without disclosing other confidential information about the client.

For example, the validation server can generate a digest corresponding to the entity that manages the client domain which identifier is "45979230632" with a timestamp "2018-02-08T00:00:11Z" according to the "subscriber_45979230632_timestamp_2018-02-08T00:00:11Z" nomenclature:
f4b542f76be38153ecc66b7c4aaa87a04c46def8116d185c132e1c4a1f515203

The DOTS client can obtain ($403_C$) the digest if it is a client of the access provider hosting the validation server.

If no digest is received, the IP resource is not validated.

This/These digest(s) is/are then transmitted ($404_C$) to the DOTS access control server by the client.

Upon reception ($41_S$) of the digest, the DOTS access control server sends ($43_S$) DOTS_PROBE_REQUEST validation messages to the validation servers R1, . . . , Ri. These messages comprise the digest previously communicated by the customer, as well as the IP resource to be validated. Without a digest, the access control server cannot identify the client concerned, and the IP resource is not validated.

Upon reception ($44_V$) of a validation message by a validation server Ri, the latter verifies whether the IP resource to be validated (address/prefix) is actually allocated to the client identified by said digest.

If it is, the IP resource is validated, otherwise, the IP resource is not validated.

A confirmation message (DOTS_PROBE_REPLY) or an error message can be transmitted to the access control server.

The next operations are similar to those of the first embodiment "DOTS Probing".

Figure 16:
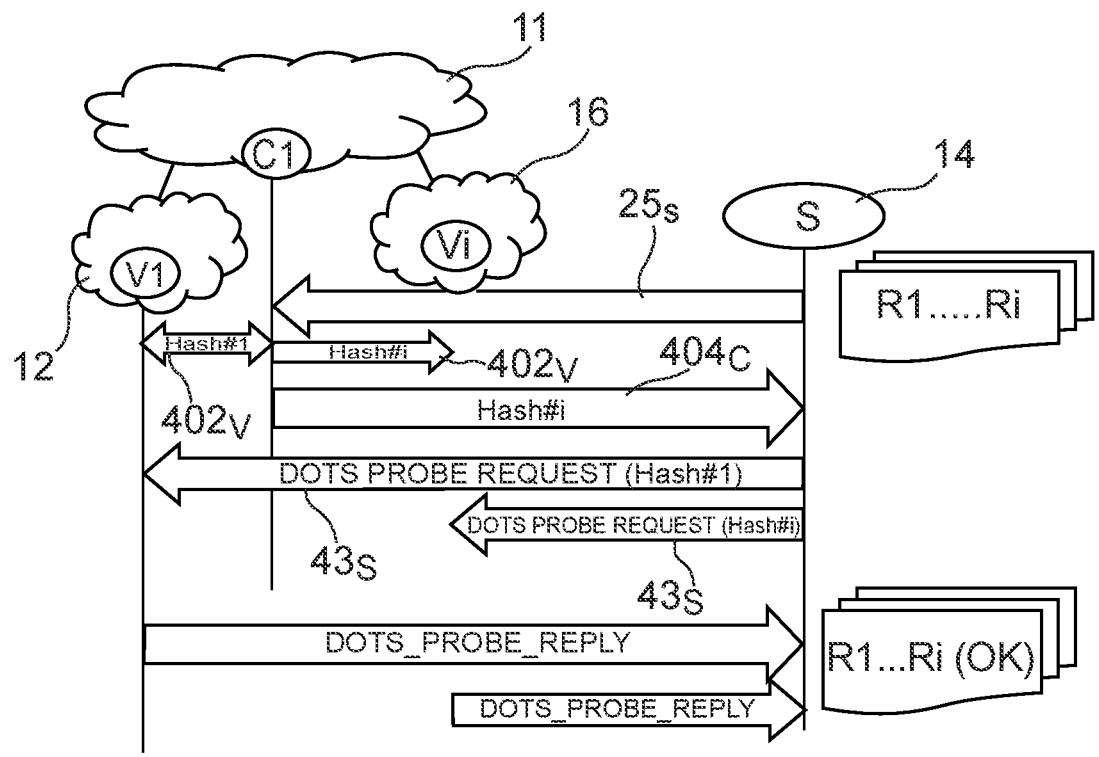
FIG. 16 shows an embodiment of the verification procedure according to a second embodiment known as "Cooperating DOTS/ISPs"

FIG. 16 illustrates an example of a successful validation of all the IP resources associated with a DOTS client. It is assumed in this example that the access control server 14 informs the client of the list of selected addresses to be validated ($25_S$), for example the addresses R1 to Ri. It is recalled that this step is optional. Upon reception of this list, the DOTS client queries the validation servers V1 of a first access provider 12 and Vi of an i-th access provider 16, associated with the IP resources R1, ..., Ri to be validated, to obtain ($403_C$) an item of information representative of the identity of the client domain, then transmits ($404_C$) this item of information to the access control server.

Then, the access control server can send ($43_S$) DOTS_PROBE_REQUEST validation messages to the validation server(s), carrying the IP resource to be validated and the item of information representative of the identity of the client domain.

The validation server(s) verifies/verify that the IP resource carried by the DOTS_PROBE_REQUEST validation message is actually associated with the domain identified by the item of information representative of the identity of the client domain. If such is the case, the status of the addresses R1 to Ri is therefore "validated".

Possibly, the validation server(s) send(s) a DOTS_PROBE_REPLY response to the DOTS access control server.

5.3 Structures

Figure 17:
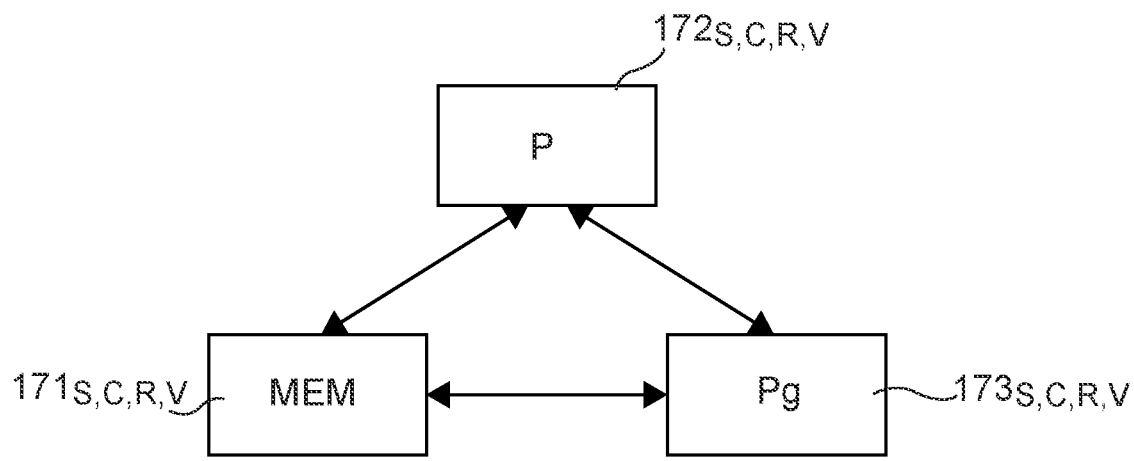
FIG. 17 shows the simplified structure of an access control server, validation server, client node or relay node according to a particular embodiment.

Finally, the simplified structures of an access control server, a client node, a relay node and a validation server according to one of the embodiments are described above in relation to FIG. 17.

According to a particular embodiment, an access control server comprises a memory $171_S$ comprising a buffer memory, a processing unit $172_S$, equipped for example with a programmable computing machine or a dedicated computing machine, for example a P processor, and controlled by the computer program $173_S$, implementing steps of the method for verifying the validity of an IP resource according to one embodiment of the invention.

At initialisation, the code instructions of the computer program $173_S$ are for example loaded into a RAM memory before being executed by the processor of the processing unit $172_S$.

The processor of the processing unit $172_S$ implements steps of the method for verifying the validity of an IP resource previously described, according to the instructions of the computer program $173_S$, to:
  receive a list of at least one IP resource associated with the client domain, transmitted from a client node of the client domain to the access control server;
  select at least one IP resource to be validated from the list;
  verify the validity of the selected IP resource(s).

According to a particular embodiment, a client node comprises a memory $171_C$ comprising a buffer memory, a processing unit $172_C$, equipped for example with a programmable computing machine or a dedicated computing machine, for example a P processor, and controlled by the computer program $173_C$, implementing steps of the method for declaring an IP resource according to one embodiment of the invention.

At initialisation, the code instructions of the computer program $173_C$ are for example loaded into a RAM memory before being executed by the processor of the processing unit $172_C$.

The processor of the processing unit $172_C$ implements steps of the method for declaring an IP resource previously described, according to the instructions of the computer program $173_C$, to:
  obtain a list of at least one IP resource associated with the client domain to which the client node belongs;
  transmit the list to an access control server.

According to a particular embodiment, a relay node comprises a memory 171R comprising a buffer memory, a processing unit 172R, equipped for example with a programmable computing machine or a dedicated computing machine, for example a P processor, and controlled by the computer program 173R, implementing steps of the method for processing an IP resource validation request according to one embodiment of the invention.

At initialisation, the code instructions of the computer program 173R are for example loaded into a RAM memory before being executed by the processor of the processing unit 172R.

The processor of the processing unit 172R implements steps of the method for processing an IP resource validation request previously described, according to the instructions of the computer program 173R, to:
  receive at least one request comprising a control message, originating from an access control server,
  transmit the request(s) to a client node of the client domain,
said relay node being associated with at least one IP resource selected by the access control server from a list of at least one IP resource associated with the client domain, the list being previously transmitted from a client node of the client domain to the access control server.

In particular, such a relay node can activate the previously defined "DOTS_CHECK_RELAY" function.

According to a particular embodiment, a validation server comprises a memory $171_V$ comprising a buffer memory, a processing unit $172_V$, equipped for example with a programmable computing machine or a dedicated computing machine, for example a P processor, and controlled by the computer program $173_V$, implementing steps of the method for verifying the validity of an IP resource according to one embodiment of the invention.

At initialisation, the code instructions of the computer program $173_V$ are for example loaded into a RAM memory before being executed by the processor of the processing unit $172_V$.

The processor of the processing unit $172_V$ implements steps of the method for verifying the validity of an IP resource previously described, according to the instructions of the computer program $173_V$, to:
  receive or intercept at least one request comprising an item of information representative of the identity of a client domain and of at least one selected IP resources,
  identify the client domain based on the item of information representative of the identity of the client domain,
  verify the association of the selected IP resource with the client domain, taking into account the identity of the client domain.

The invention claimed is:
1. A method for verifying validity of an IP resource associated with a client domain, implemented in a server, called an access control server, said method comprising:

receiving a list of at least one IP resource associated with said client domain, transmitted from a client node of said client domain to said access control server;

selecting at least one IP resource to be validated from said list, the at least one IP resource selected identifying at least another client node, which is different than the client node that transmitted the list; and verifying that said at least one selected IP resource identifying at least another client node is actually associated with said client domain comprising the client node that transmitted the list, prior to initiating, by said access control server, any action related to said at least one selected IP resource, wherein the verifying comprises:

transmitting at least one request to the at least one selected IP resource, to be received or intercepted by at least one relay node of said client domain associated with said at least one selected IP resource, said request comprising a control message;

receiving a response to the request including an item of information characteristic of said control message, transmitted by said client node to said access control server, said relay node having previously relayed said request to said client node; and validating said at least one IP resource selected by correlating said request and said response, wherein said at least one IP resource selected belongs to a group consisting of an IP address, an IP prefix and a domain name.

2. The method according to claim 1, comprising selecting at least one further IP resource to be validated from said list, and wherein said verification further comprises:

obtaining an item of information representative of an identity of said client domain;

identifying at least one validation server associated with said at least one selected further IP resource; and transmitting to said at least one validation server at least one request comprising said item of information representative of the identity of said client domain and said at least one selected further IP resource.

3. The method according to claim 1, wherein a validity period is associated with said list of at least one IP resource associated with the client domain.

4. The method according to claim 1, comprising initiating an action in response to a request for action on the at least another client node identified by said at least one selected IP resource.

5. The method according to claim 4, wherein said request for action comprises an information that said client domain is under attack and wherein said action is a mitigation action so that suspicious traffic is no longer routed to said client domain.

6. The method according to claim 1, comprising receiving a request from a client node of said client domain and to take at least one action to control access to said client domain in response to said request.

7. The method according to claim 1, wherein said client domain is a DOTS (DDoS (Distributed Denial of Service) Open Threat Signaling) domain, said access control server is a DOTS server, and said client node is a DOTS client, and wherein the method further comprises deleting, in a table of DOTS entries maintained by the access control server, the DOTS entries indicating IP resources that are not part of the list transmitted by said client node or rejecting DOTS requests indicating an IP resource that is not part of the list transmitted by said client node.

8. The method according to claim 1, wherein the list of at least one IP resource is a list of at least two IP resources.

9. The method according to claim 8, wherein the access control server does not belong to the client domain.

10. A method for declaring an IP resource associated with a client domain, said method being implemented in a client node of said client domain and comprising:

obtaining by the client node a list of at least one IP resource associated with the client domain;

transmitting said list by the client node to an access control server configured to verify that said at least one IP resource is actually associated with said client domain;

receiving at least one request originating from said access control server, via at least one relay node of said client domain associated with at least one IP resource selected from said list by said access control server, said at least one IP resource selected belonging to a group consisting of an IP address, an IP prefix and a domain name, said at least one IP resource selected identifying at least another client node, which is different than the client node that transmitted the list, and said request comprising a control message; and transmitting to said access control server a response to the request including an item of information characteristic of said control message.

11. The method according to claim 10, comprising:

receiving an item of information representative of an identity of said client domain, generated by a validation server associated with at least one IP resource selected from said list by said access control server; and transmitting to said access control server said item of information representative of the identity of said client domain.

12. The method according to claim 10, wherein a validity period is associated with said list of at least one IP resource associated with the client domain.

13. A method for processing at least one IP resource validation request associated with a client domain, said method comprising:

receiving or intercepting by a relay node of the client domain at least one request to at least one selected IP resource associated with the client domain, said at least one request originating from an access control server and comprising a control message, the at least one IP resource having been selected by the access control server from a list of at least one IP resource actually associated with the client domain and belonging to a group consisting of an IP address, an IP prefix and a domain name, the list being previously transmitted from a client node of said client domain to said access control server, and the at least one IP resource selected identifying at least another client node, which is different than the client node that transmitted the list; and transmitting by the relay node said at least one request to said client node.

14. The method according to claim 13, wherein a validity period is associated with said list of at least one IP resource associated with the client domain.

15. A method for verifying validity of an IP resource associated with a client domain, said method comprising:

receiving by a validation server at least one request comprising an item of information representative of an identity of a client domain and of said at least one selected IP resource, the validation server being associated with the at least one selected IP resource, which was selected by an access control server from a list of at least one IP resource associated with the client domain, the list having been previously transmitted from a client node of said client domain to said access control server, the at least one selected IP resource identifying at least another client node which is different than the client node that transmitted the list;

identifying by the validation server said client domain based on said item of information representative of the identity of the client domain; and verifying by the validation server that the at least one selected IP resource is actually associated with the client domain, taking into account the identity of the client domain, wherein the at least one selected IP resource belongs to a group consisting of an IP address, an IP prefix and a domain name.

16. The method according to claim 15, wherein the method comprises, the following acts implemented by the validation server prior to verifying validity of said at least one selected IP resource:

determining said item of information representative of the identity of said client domain; and transmitting, to said client node, said item of information representative of the identity of the client domain.

17. The method according to claim 15, wherein a validity period is associated with said list of at least one IP resource associated with the client domain.

18. An access control server comprising:

at least one programmable computing machine or one dedicated computing machine configured to verify validity of an IP resource associated with a client domain, implementing:

receiving a list of at least one IP resource associated with said client domain, transmitted from a client node of said client domain to said access control server;

selecting at least one IP resource to be validated from said list, wherein the at least one IP resource selected belongs to a group consisting of an IP address, an IP prefix and a domain name, and the at least one IP resource selected identifies at least another client node, which is different than the client node that transmitted the list; and verifying that said at least one selected IP resource identifying at least another client node is associated with said client domain comprising the client node that transmitted the list, prior to initiating, by said access control server, any action related to said at least one selected IP resource, wherein the verifying comprises:

transmitting at least one request to the at least one selected IP resource, to be received or intercepted by at least one relay node of said client domain associated with said at least one selected IP resource, said request comprising a control message;

receiving a response to the request including an item of information characteristic of said control message, transmitted by said client node to said access control server, said relay node having previously relayed said request to said client node; and validating said at least one IP resource selected by correlating said request and said response.

* * * * *